(12) United States Patent
Kitada

(10) Patent No.: US 8,424,103 B2
(45) Date of Patent: Apr. 16, 2013

(54) AUTHENTICATED PRINTING SYSTEM AND AUTHENTICATED PRINTING METHOD

(75) Inventor: Naruhide Kitada, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1004 days.

(21) Appl. No.: 12/056,196

(22) Filed: Mar. 26, 2008

(65) Prior Publication Data

US 2008/0244756 A1    Oct. 2, 2008

(30) Foreign Application Priority Data

Mar. 27, 2007  (JP) ................................. 2007-082782

(51) Int. Cl.
*H04L 9/32*  (2006.01)

(52) U.S. Cl.
USPC ....................... 726/28; 726/2; 726/26; 726/27

(58) Field of Classification Search ................ 726/2, 28, 726/26, 27; 358/1.14, 1.15, 3.28
See application file for complete search history.

(56) References Cited

U.S. PATENT DOCUMENTS

| 2001/0007130 | A1* | 7/2001 | Takaragi | ........................ | 713/186 |
| 2003/0212863 | A1* | 11/2003 | Ganguly et al. | ............... | 711/118 |
| 2005/0134896 | A1* | 6/2005 | Koga | ........................... | 358/1.14 |

FOREIGN PATENT DOCUMENTS

| JP | 08-152981 | A | 6/1996 |
| JP | 2002-116894 | A | 4/2002 |
| JP | 2002-187317 | A | 7/2002 |
| JP | 2003-044442 | A | 2/2003 |
| JP | 2004-249625 | A | 9/2004 |
| JP | 2005-014591 | A | 1/2005 |
| JP | 2005-018741 | A | 1/2005 |
| JP | 2005-122307 | A | 5/2005 |
| JP | 2005-238734 | A | 9/2005 |
| JP | 2005-352752 | A | 12/2005 |
| JP | 2006-043931 | A | 2/2006 |
| JP | 2006-099724 | A | 4/2006 |

OTHER PUBLICATIONS

JP 2005-014591 with the English Translation, pp. 1-37.*
JP 2006-043931 with the English Translation, pp. 1-53.*

* cited by examiner

*Primary Examiner* — Edward Zee
*Assistant Examiner* — Baotran N To
(74) *Attorney, Agent, or Firm* — Sughrue Mion, PLLC

(57) ABSTRACT

An authenticated printing system includes a job creation unit that creates a print job in accordance with a direction of a user, a job holding unit that holds the print job created by the job creation unit, an authentication information acquisition unit that generates authentication information based on information acquired from an authentication device, an authentication unit that receives the authentication information generated by the authentication information acquisition unit and performs authentication of an user on the basis of the authentication information, and a print unit that acquires the print job of an authenticated user from the job holding unit and prints the print job in a case where the user is authenticated by the authentication unit. The authentication unit includes a process section that acquires the authentication information of an owner of the print job from a database and stores the authentication information in a cache as authentication usable information when the print job is held by the job holding unit, and a process section that performs the authentication of a user based on whether the authentication information generated by the authentication information acquisition unit is stored in the cache.

10 Claims, 12 Drawing Sheets

FIG. 3

- MACRO SENTENCE = COMMAND SENTENCE*
- COMMAND SENTENCE = SUBSTITUTION SENTENCE | FUNCTION CALL | if SENTENCE
- SUBSTITUTION SENTENCE := VARIABLE = CONSTANT | VARIABLE | FUNCTION CALL
- FUNCTION CALL := FUNCTION NAME ([NUMERAL VALUE] (NUMERAL VALUE)*);
- IF SENTENCE := IF (VARIABLE) {COMMAND SENTENCE*} ELSE {COMMAND SENTENCE*}
- NUMERAL VALUE := CONSTANT | VARIABLE
- VARIABLE := $VARIABLE NAME
- VARIABLE NAME := [a-zA-Z0-9] [a-zA-Z0-9]*
- CONSTANT := "[a-zA-Z0-9/-=]*"

FIG. 4

Fingerprint_Prepare($USER_ID): — 141
$TMP=AddString("CN=",USER_ID); — 142
Ldap_CacheAttribute($TMP,"Title"); — 143

```
$USER_ID=Fingerprint_Authentication($FINGER_DATA):      — 151
$TMP=Equals($USER_ID,  ""):                              — 152
if($TMP) {                                              ⎫
        $AUTH_RESULT = "FALSE" :                        ⎬ 153
} else {                                                ⎭ — 154
        $TMP=Ldap_GetAttribute( $USER_ID,"Title") :     — 155
        $TMP=Equals( $TMP , "Manager") :                — 156
        if($TMP) {                                      ⎫
        $AUTH_RESULT = "TRUE" :                         ⎬ 157
        } else {                                        ⎭
        $AUTH_RESULT = "FALSE" :                        } 158
        }
}
```

| USER INFORMATION : USER_X          | — 111 |
| PRINTER PRODUCT NUMBER : XX_XXX    |
| PAPER SHEET : A4                   | mmmmmmm........    — 112
mmmmmmm........
mmmmmmm........
mmmmmmm........

FIG. 11

$FINGER_DATA="MMMmmm1122..."

FIG. 12

$USER_ID="USER_X"
$AUTH_RESULT="TRUE"

AUTHENTICATED PRINTING SYSTEM AND AUTHENTICATED PRINTING METHOD

BACKGROUND

1. Technical Field

The present invention relates to authenticated print processing technology for printing data in front of a user after the user is authenticated.

2. Related Art

While security of the whole IT system is required, as printing technology considering security relating to output from a printer, authenticated printing systems in which only a user who has directed printing can acquire a print output by temporarily holding data directed to be printed by a user and printing the data on the condition that the user is authenticated have been disclosed.

In general authenticated printing systems, an authentication process is performed after a user performs an authentication operation at a printer. However, in this authentication process, a complex process such as handling of biometric information or high-level encryption is required. Accordingly, initiation of a printing process is necessarily delayed in the general authenticated printing systems, and thereby the user tends to have uneasiness and an unpleasant feeling.

On the contrary, in JP-A-2002-187317, an authenticated printing system capable of shortening a time up to initiation of a printing process by skipping authentication of a part for which authentication is designated not to be required by a user has been disclosed.

However, there are problems in the authenticated printing system disclosed in JP-A-2002-187317 in terms of both speed of the authentication process and security as described below. In other words, in the authenticated printing system disclosed in JP-A-2002-187317, the authentication process is not improved much, and accordingly, a time required for initiating a printing process for a job requiring authentication has not been improved. In addition, in a case where a job not to be authenticated can be designated, an easy way for avoiding authentication is given to a user, and there is a tendency that the user does not use the authenticated printing for avoiding a waiting time for the authenticated printing process.

SUMMARY

An advantage of some aspects of the invention is that it provides an authenticated printing system and an authenticated printing method capable of performing authentication at high speed in an authenticated printing process.

According to a first aspect of the invention, there is provided an authenticated printing system including: a job creation unit that creates a print job in accordance with a direction of a user; a job holding unit that holds the print job created by the job creation unit; an authentication information acquisition unit that generates authentication information based on information acquired from an authentication device; an authentication unit that receives the authentication information generated by the authentication information acquisition unit and performs authentication of an user on the basis of the authentication information; and a print unit that acquires the print job of an authenticated user from the job holding unit and prints the print job in a case where the user is authenticated by the authentication unit, wherein the authentication unit includes: a process section that acquires the authentication information of an owner of the print job from a database and stores the authentication information in a cache as authentication usable information when the print job is held by the job holding unit, and a process section that performs the authentication of a user based on whether the authentication information generated by the authentication information acquisition unit is stored in the cache. According to the aspect above, by preparing information required for authentication in a cache in advance in an authenticated printing process, the authentication can be performed at high speed, and thereby convenience of the authenticated printing process can be improved. In particular, since it takes considerable time for verifying data such as a fingerprint or a face image, a processing time required for verification can be shortened by limiting search targets so as to reduce population thereof, and thereby authentication can be performed at high speed.

According to a second aspect of the invention, there is provided an authenticated printing system that is configured by connecting a user terminal, a print server, and a printer through a network. The user terminal includes a job creation unit that creates a print job in accordance with a direction of a user. The print server includes a job holding unit that receives the print job created by the job creation unit and holds the print job and an authentication unit that receives authentication information generated by an authentication information acquisition unit and performs authentication of a user based on the authentication information. The printer includes the authentication information acquisition unit that generates the authentication information based on information acquired from an authentication device and a print unit that acquires the print job of an authenticated user from the job holding unit and prints the print job in a case where the user is authenticated by the authentication unit. Here, the authentication unit includes: a process section that acquires the authentication information of an owner of the print job from a database and stores the authentication information in a cache as authentication usable information when the print job is held by the job holding unit, and a process section that performs the authentication of a user based on whether the authentication information generated by the authentication information acquisition unit is stored in the cache. According to the aspect above, by preparing information required for authentication in a cache in advance in an authenticated printing process, the authentication can be performed at high speed, and thereby convenience of the authenticated printing process can be improved.

In the aspects above, it is preferable that a result of a static process relating to the authentication is maintained in the authentication usable information. User attribute information such as LDAP data is scarcely changed, and accordingly, when such data is authenticated every time, overhead is generated. Thus, in such a case, unchanging information is generated in advance in a case where static information such as LDAP or RDBMS is used for authentication, and thereby high-speed authentication is achieved.

In addition, in the aspect above, it is preferable that the authentication usable information is managed such that the authentication usable information can be deleted in accordance with a maintaining time of the print job. It is more preferable that the authentication usable information is managed such that the oldest authentication usable information can be deleted preferentially. In such a case, since a cache is managed such that authentication usable information can be deleted in accordance with a maintaining time of a print job, a burden on the server resource is reduced, and thereby it is possible to use the cache in an effective manner.

According to a third aspect of the invention, there is provided an authenticated printing method including: creating a print job in accordance with a direction of a user; holding the print job created by the creating of a print job in a spooler;

acquiring authentication information of an owner of the print job from a database and storing the authentication information in a cache as authentication usable information when the print job is held by the holding of the print job; generating the authentication information based on information acquired from an authentication device; receiving the authentication information generated by the generating of the authentication information and performing authentication of a user based on whether the authentication information is stored in the cache; and acquiring the print job of an authenticated user from the spooler and printing the print job in a case where the user is authenticated by the receiving of the authentication information.

According to a fourth aspect of the invention, there is provided a program allowing a computer to perform the above-described authenticated printing method. The program may be installed to or loaded in a computer by using various recording media such as an optical disc including a CD-ROM, a magnetic disk, or a semiconductor memory or by downloading the program through a communication network or the like.

In descriptions below, means does not mean only physical means and includes a case where the function included in the means is implemented in software. In addition, the function included in one means may be implemented by two or more physical means, and functions of two means or more may be implemented by one physical means.

BRIEF DESCRIPTION OF THE DRAWINGS

The invention will be described with reference to the accompanying drawings, wherein like numbers reference like elements.

FIG. 3 is a diagram showing the syntax of a macro sentence according to an embodiment of the invention.

FIG. 4 is a diagram showing an example of the job holding macro.

FIG. 5 is a diagram showing an example of an authentication macro according to an embodiment of the invention.

FIG. 6 is a schematic diagram showing the data structure of a print job according to an embodiment of the invention.

FIG. 11 is a diagram showing an example of authentication information generated by authentication information acquisition means according to an embodiment of the invention.

FIG. 12 is a diagram showing an example of an authentication result returned to a printer from an authentication means according to an embodiment of the invention.

DESCRIPTION OF EXEMPLARY EMBODIMENTS

Figure 1:
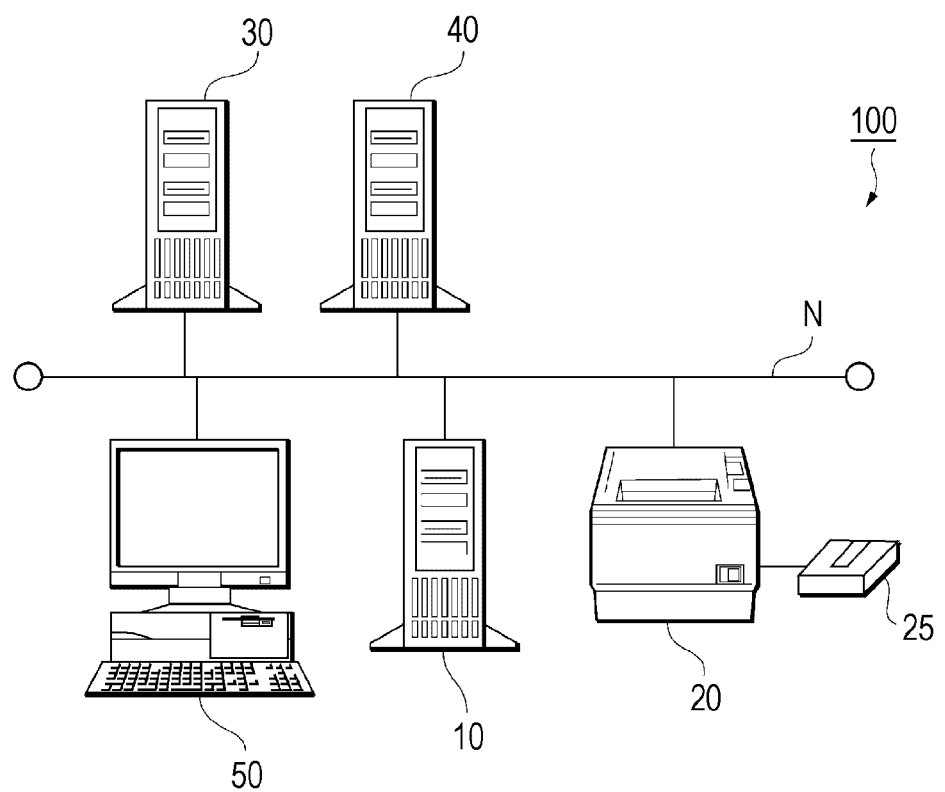
FIG. 1 is a block diagram showing the whole configuration of an authenticated printing system according to an embodiment of the invention.

Hereinafter, embodiments of the present invention will be described with reference to the accompanying drawing. To same elements, same reference numerals are attached, and a duplicate description thereof will be omitted.

FIG. 1 is a block diagram showing the whole configuration of an authenticated printing system 100 according to an embodiment of the invention. As shown in FIG. 1, the authenticated printing system 100 includes a print server 10, a printer 20, an LDAP server 30, a fingerprint server 40, and a user terminal 50 and is configured by interconnecting the above-described devices through a network N.

The print server 10 is a server computer that manages and controls a print process including authenticated printing. The authenticated printing means a process in which the printer 20 does not immediately perform a printing process in a case where the printer 20 receives print data from the user terminal 50 and holds a print job and a print job corresponding to input authentication information is acquired from a spooler and the print job is printed by the printer 20 in a case where a user succeeds in authentication by inputting the authentication information such as a fingerprint to the printer 20 and a process equivalent to the above-described printing process.

The printer 20 serves as an image forming apparatus and has a function for printing a formed image on a recording medium such as a paper sheet. To the printer 20, an authentication device used for reading out authentication information is connected. In this embodiment, since a fingerprint is used as the authentication information, a fingerprint reader 25 for reading out a fingerprint is connected to the printer 20. Then, an authenticated printing process is performed based on fingerprint data read by the fingerprint reader 25.

The LDAP server 30 is a directory server that provides an LDAP authentication service. The LDAP server 30 has functions for managing information such as a title of a user using the authenticated printing system 100 and environment and searching for user information by using a user ID or the like as a key. The fingerprint server 40 has a function for managing the fingerprint data of a user using the authenticated printing system 100 in association with a user name, a user ID, and the like.

The user terminal 50 is a computer operated by a user, and a personal computer (PC) or mobile terminal may be used as the user terminal. In this embodiment, when a user directs a printing process, the user terminal 50 creates a print job and transmits the print job to the printer sever 10.

The network N is a communication line for transmitting and receiving information among the print server 10, the printer 20, the LDAP server 30, the fingerprint server 40, and the user terminal 50. For example, the network N may be a LAN, the Internet, a dedicated line, a packet-switched network, a telephone line, and a network inside a company, any other communication line, or a combination of the above-described networks. The network N may be wired or wireless.

Each of the print server 10, the LDAP server 30, and the fingerprint server 40 may be configured as a single computer or may be configured by a plurality of computers distributed over a network. In addition, a single computer may have functions of two servers or more. The hardware configuration of the computer, for example, includes a CPU that is control means for controlling operations and processes of other units, a memory including a ROM for storing data required for a process, a RAM serving as a work area, and the like, a storage device such as a hard disk for storing various information, an input/output interface, a communication interface, and a bus interconnecting other units. By the CPU's executing a predetermined program stored in a memory or an external storage device, each means to be described later is implemented.

Figure 2:
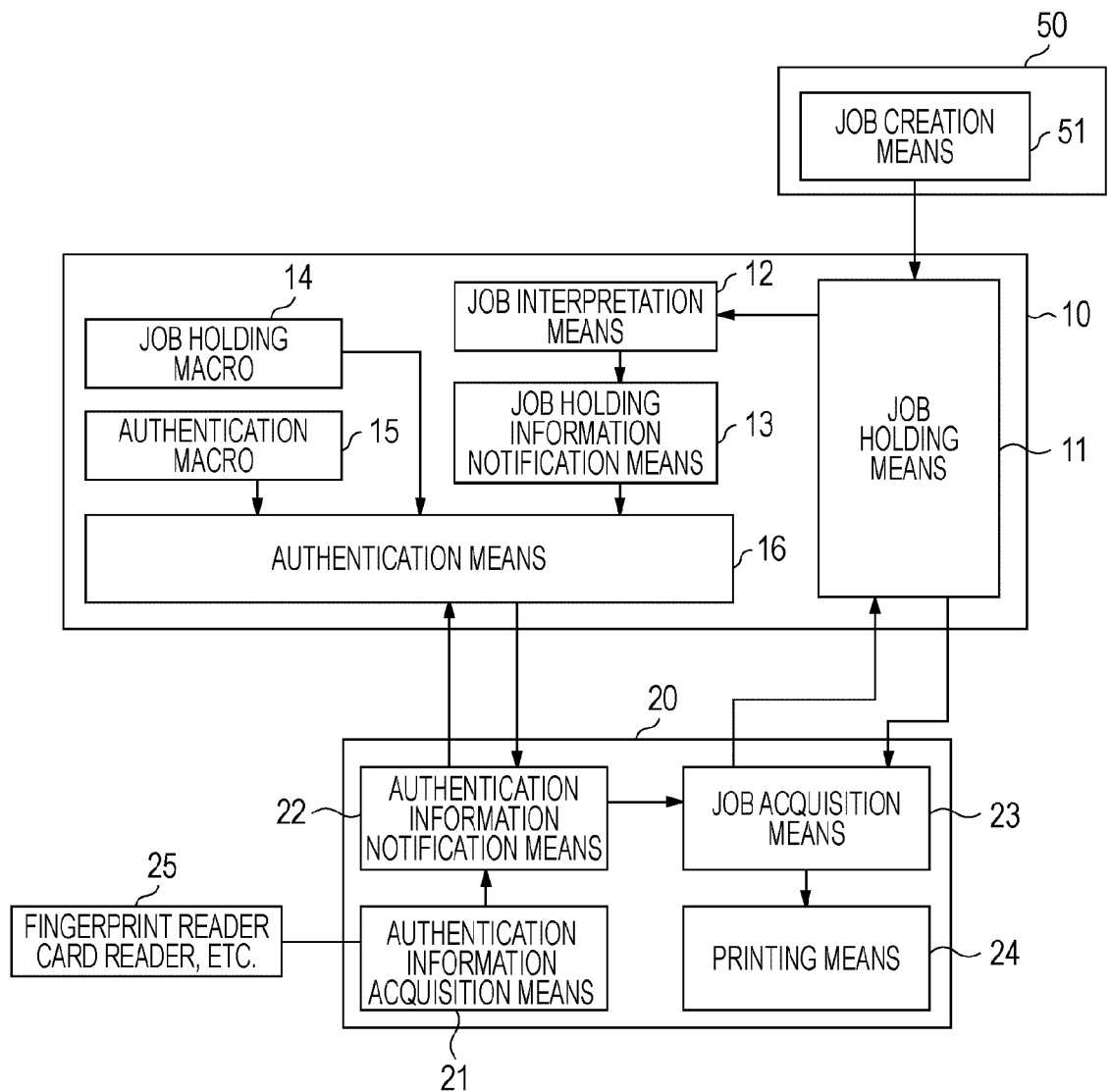
FIG. 2 is a block diagram showing a functional configuration of the authenticated printing system.

FIG. 2 is a block diagram showing a functional configuration of the authenticated printing system 100 according to this embodiment. As shown in FIG. 2, the print server 10 includes job holding means 11, job interpretation means 12, job holding information notification means 13, a job holding macro 14, an authentication macro 15, and authentication means 16. The printer 20 includes authentication information acquisition means 21, authentication information notification means 22, job acquisition means 23, and printing means 24. The user terminal 50 includes job creation means 51.

The job holding means 11 has a function for holding a print job received from the user terminal 50. The job interpretation means 12 has a function for generating job holding information by interpreting a print job in a case where the job holding means 11 holds the print job. The job holding information notification means 13 has a function for notifying the authentication means 16 of the job holding information generated by the job interpretation means 12.

The job holding macro 14 is executed when a print job is held. The job holding macro 14 is a macro for performing a job holding process in which finger verification data is cached based on the user information assigned to the print job. The authentication macro 15 is executed when a user performs an authentication operation for the printer 20. The authentication macro 15 is a macro for performing an authentication process in which the fingerprint data read out by the fingerprint reader 25 is authenticated, user information such as a user name and the like which have been identified thereby is checked, and the result of the authentication is returned. Here, a macro is a function for automating a predetermined operation sequence by describing the operation sequence as a program. In this embodiment, as an example of the job holding process and the authentication process, although an example in which the processes are executed by macros is shown, however, it is apparent that the job holding process and the authentication process are not necessarily implemented as a macro.

The authentication means 16 has a function for performing a user authentication process based on the authentication information such as the fingerprint data received from the printer 20. In this embodiment, the authentication means 16 executes the job holding macro 14 prior to the user authentication process in a case where the print job is held by the job holding means 11, and thereby acquires the fingerprint data of an owner of the print job from the fingerprint server 40 and stores the fingerprint data in a cache in advance. In addition, the authentication means 16 acquires necessary information from the LDAP server 30 as is required and stores the information in the cache. Thereafter, when the user inputs the authentication information to the printer 20 for performing a printing process, the authentication process is performed based on the authentication information received from the printer and the fingerprint data prepared in the cache in advance by executing the authentication macro 15. In this embodiment, in the job holding macro 14 and the authentication macro 15, macro sentences are described in accordance with a syntax shown in FIG. 3. The authentication means 16 parses macro sentences LL(2) configured in the job holding macro 14 and the authentication macro 15 by using a top-down parser and executes the macro sentences.

The authentication information acquisition means 21 has a function for generating authentication information based on the information acquired from an authentication device (the fingerprint reader 25). The authentication information notification means 22 has a function for notifying the authentication means 16 of the print server 10 of the authentication information generated by the authentication information acquisition means 21. The job acquisition means 23 has a function for receiving the result of authentication of the authentication information such as a fingerprint through the authentication information notification means 22 and acquiring a print job held by a corresponding user from the job holding means 11 of the print server 10 based on the result of the authentication. The printing means 24 has a function for receiving the print job acquired by the job acquisition means 23 and performing a printing process for the print job on a recording medium such as a paper sheet. In other words, the printer 20 determines whether the authentication has succeeded based on the result of the authentication returned from the authentication means 16. Then, when the authentication succeeds, the printer 20 acquires a print job of the corresponding user from the job holding means 11 and prints out the print job from the printing means 24.

The job creation means 51 has a function for creating data of a print job in accordance with a user's direction and transmitting the print job to the print server 10.

Next, the configurations of data used in the authenticated printing system 100 and data stored in each storage means of the authenticated printing system 100 will be described. However, first, as a premise thereof, syntax of a macro sentence and the like which are used in this embodiment will be described. Thereafter, the configuration of each data will be described.

FIG. 3 is a diagram showing the syntax of a macro sentence which is used in this embodiment. In FIG. 3, ":=" represents that an element on the left side thereof is defined as the content on the right side. "[ ]" represents that an element may exist. "|" represents that any one element is selected. "*" represents an element is not repeated or is repeated once or more times. When a sentence is described as "$A="B";", it represents that a value of B is substituted into a variable of A.

The authentication means 16 has a function (Equals function) for determining whether two values are the same, a function (AddString function) for connecting two text strings, a function (Ldap_CacheAttribute function) for performing LDAP search and caching a corresponding attribute, a function (Ldap_GetAttribute function) for searching for cached LDAP data and acquiring the LDAP data, a function (Fingerprint_Prepare function) for caching fingerprint data of a designated user, and a function (Fingerprint_Authentication function) for checking a user according to designated fingerprint data that has been cached. The authentication means 16 performs a process in accordance with a description of a macro sentence.

FIG. 4 is a diagram showing an example of the job holding macro 14. The macro shown in FIG. 4 as an example is executed when a print job is held. The macro represents that the fingerprint verification data is cached based on the user information assigned to the print job. In the figure, a variable $USER_ID includes user identification information assigned to the print job. A macro of Fingerprint_Prepare($USER_ID) in the $141^{st}$ line uses a value included in the variable. In other words, the macro has the same value as that of Fingerprint_Prepare("USER_X") in an example to be described later.

FIG. 5 is a diagram showing an example of the authentication macro 15. The macro shown in FIG. 5 as an example is executed when a used performs an authentication operation at the printer 20. The macro represents that authentication of the fingerprint data read out by the fingerprint reader 25 of the printer 20 is performed, an identified user name on the basis of the result of the authentication is included in variable $USER_ID, whether the attribute of the title (Title) of the user in the LDAP server 30 is "Manager" is checked, and the result of the authentication is included in variable $AUTH_RESULT and returned. In the figure, in variable $FINGER_DATA, the fingerprint data generated by the authentication information acquisition means 21 as the result of reading out the user's fingerprint by the fingerprint reader 25 is included.

FIG. 6 is a schematic diagram showing the data structure of a print job that is created by the job creation means 51 of the user terminal 50 and is held by the job holding means 11 of the printer server 10. As shown in FIG. 6, the print job includes a job meta data section 111 in which meta data of the print job is described and a print data section 112 in which image data to be printed is described. In the job meta data section 111, information such as user information of the print job, a printer product number of the print destination, a paper size, and the like is included. For example, in the example of the print job shown in FIG. 6, the user information is "USER_X", the printer product number is "XX-XXX", and the paper size is "A4".

Figure 7:
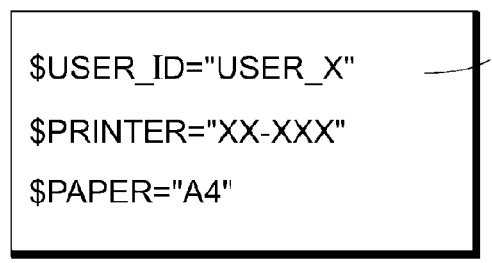
FIG. 7 is a schematic diagram showing the data structure of job holding information according to an embodiment of the invention.

FIG. 7 is a schematic diagram showing the data structure of the job holding information that is generated by interpreting a holding print job by using the job interpretation means 12 and transmitted to the authentication means 16 through the job holding information notification means 13. As shown in FIG. 4, the job holding information includes attribute information 131 such as the user information, the printer product number, and the paper size which is acquired by interpreting the print job. In the example shown in FIG. 4, as the job holding information, "USER_X" is set to variable $USER_ID, "XX-XXX" is set to variable $PRINTER, and "A4" is set to variable $PAPER.

Figure 8:
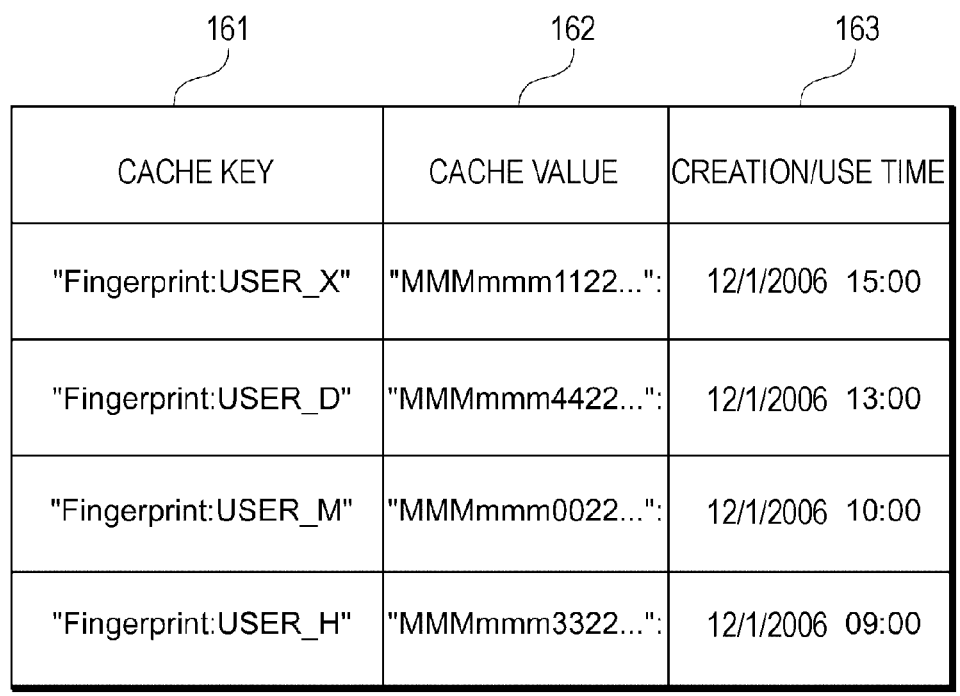
FIG. 8 is a diagram showing the structure of data cached as authentication usable information according to an embodiment of the invention.

FIG. 8 is a diagram showing the structure of data cached as authentication usable information by the authentication means 16. Each record of the authentication usable information includes a cache key 161 for identifying each record in the cache, a cache value 162 in which the authentication information is stored, and creation/use time 163 representing data and time when the record is created or used, as fields. The cache will be described later in detail.

Figure 9:
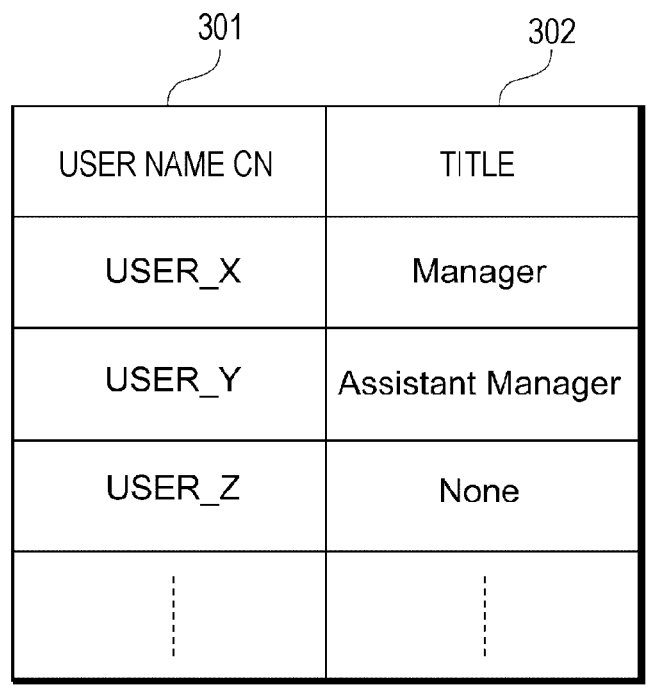
FIG. 9 is a diagram showing an example of data entry of user data in an LDAP server according to an embodiment of the invention.

FIG. 9 is a diagram showing an example of data entry of user data in the LDAP server 30. In this embodiment, as shown in FIG. 9, the user name (CN) 301 and the title (Title) 302 is stored in association with each other. Accordingly, when receiving a user name from the print server 10, the LDAP server 30 according to this embodiment returns the title corresponding to the user name to the print server 10. For example, more precisely, there may be entry such as InetOrgPerson schema including data described in FIG. 9 under a tree such as a predetermined OU (OrganizationUnit).

Figure 10:
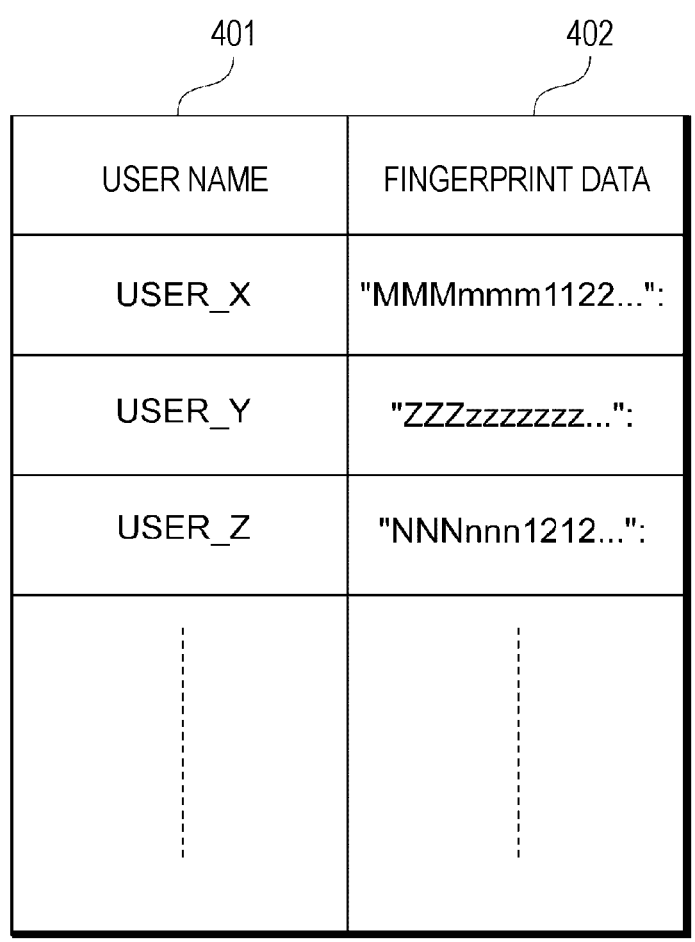
FIG. 10 is a diagram showing an example of a fingerprint authentication database managed by a fingerprint server according to an embodiment of the invention.

FIG. 10 is a diagram showing an example of a fingerprint authentication database managed by the fingerprint server 40. As shown in FIG. 10, in the fingerprint authentication database, a user name 401 and fingerprint data 402 are stored in association with each other. Accordingly, when receiving a user name from the print server 10, the fingerprint server 40 according to this embodiment returns fingerprint data associated with the user name to the print server 10. The fingerprint data is used as verification data for user authentication.

FIG. 11 is a diagram showing an example of the authentication information generated by the authentication information acquisition means 21. In this embodiment, authentication information including the fingerprint data generated as a result of a process such as a feature-point extracting process that is performed by the authentication information acquisition means 21 based on the image information of the fingerprint read out by the fingerprint reader 25 is generated and is notified to the authentication means 16. The example shown in FIG. 11 is the authentication information in which the fingerprint data "MMMmmm1122 . . . " is the value of variable $FINGER_DATA.

FIG. 12 is a diagram showing an example of the authentication result returned to the printer 20 from the authentication means 16. The example shown in the figure is an authentication result representing that variable $USER_ID is "USER_X" and variable $AUTH_RESULT is "TRUE", which indicates that the authentication of "USER_X" has succeeded. The authentication information notification means 22 can determine that the authentication has succeeded based on the authentication result returned from the authentication means 16. Then, the authentication information notification means 22 acquires the print job of user X from the job holding means 11 and prints out the print job from the printing means 24.

Next, an overview of the operation of the authenticated printing system 100 having the above-described configuration will be described. Here, an example in which user X performs an authenticated printing process will be described.

Figure 13:
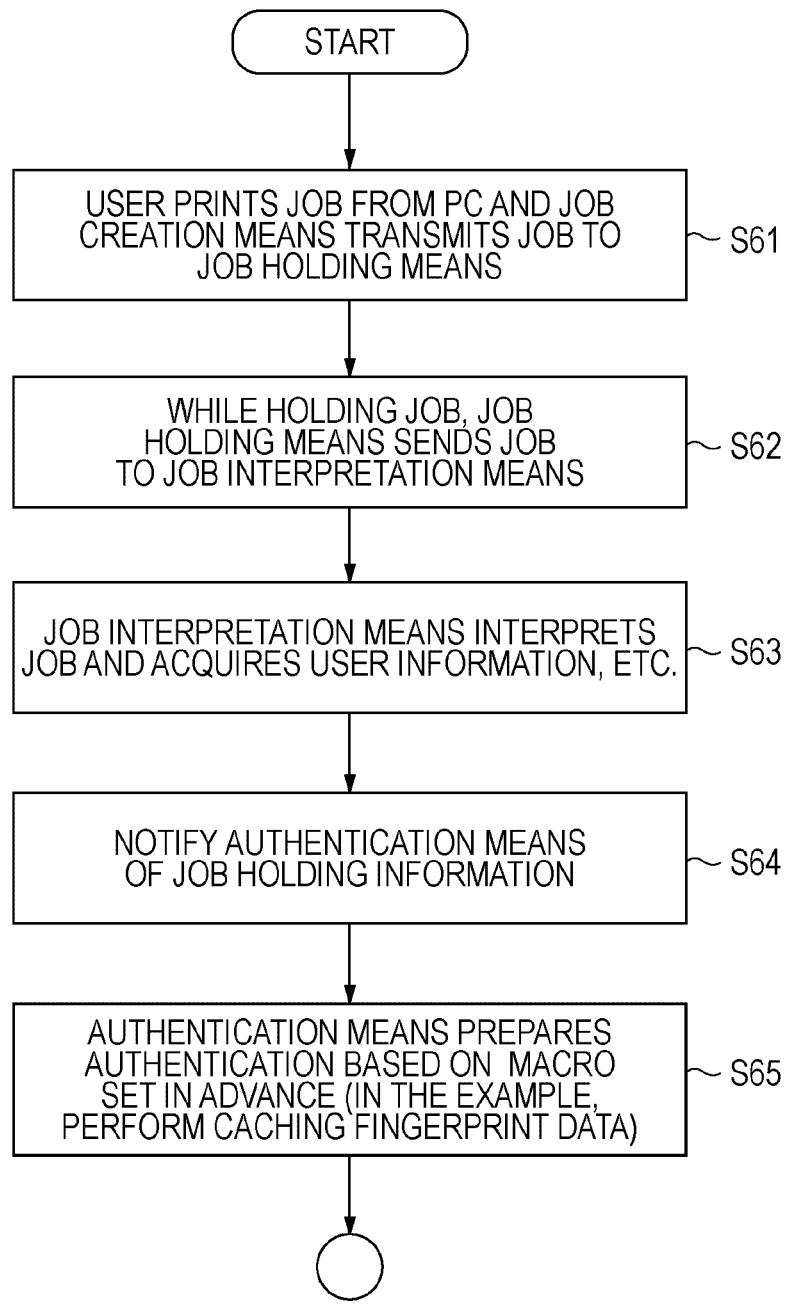
FIG. 13 is a flowchart showing a flow until an authenticated print job is held according to an embodiment of the invention.

FIG. 13 is a flowchart showing a flow until the authenticated printing system 100 holds an authenticated print job. First, when a user directs a printing process in a user terminal 50, the job creation means 51 creates a print job as shown in FIG. 6 and transmits the print job to the print server 10 (S61). When receiving the print job from the user terminal 50, the print server 10 holds the received print job by using the job holding means 11 and transmits the print job to the job interpretation means 12 (S62). The job interpretation means 12 acquires user information and the like by interpreting the print job (S63) and transmits job holding information including the user information as shown in FIG. 7 to the authentication means 16 through the job holding information notification means 13 (S64). Then, the authentication means 16 executes a job holding macro 14 based on the job holding information as a preparation process of authentication, and caches fingerprint data of the owner of the print job (S65).

When the job holding macro 14 is executed, in the example shown in FIG. 4, function Fingerprint_Prepare in the $141^{st}$ row is called with user name "USER_X". Accordingly, the fingerprint data "MMMmmm1122 . . . " of user name "USER_X" is acquired from the fingerprint database (FIG. 10) of the fingerprint server 40, and a record value as shown in FIG. 14 is added in a cache for the authentication usable information.

Figure 14:
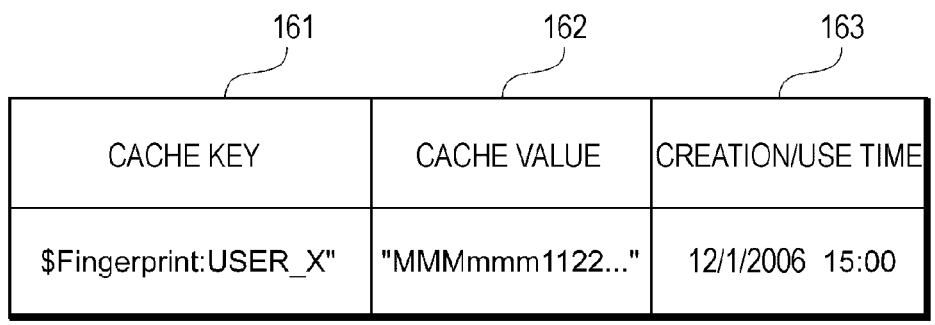
FIG. 14 is a diagram showing an example of the authentication usable information added to a cache according to an embodiment of the invention.

FIG. 14 is a diagram showing an example of the authentication usable information added to the cache for the authentication usable information. As shown in FIG. 14, the added authentication usable information, for example, is that a cache key 161 is "Fingerprint: USER-X", the cache value 162 is "MMMmmm1122 . . . ", and the generation/use time 163 is "2006/12/1 15:00".

In addition, a function of Ldap_CacheAttribute in the 143$^{rd}$ line of FIG. 4 is called with arguments as Ldap_CacheAttribute("CN=USER_X", "Title"). As a result, the title "Manager" of the user name "USER_X" is acquired from the data entry (FIG. 9) of the LDAP server 30, and a cache for authentication usable information having values as shown in FIG. 15 is added.

Figure 15:
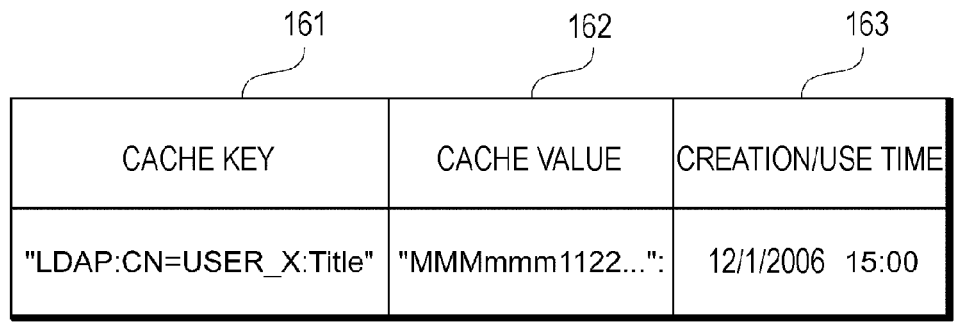
FIG. 15 is a diagram showing an example of the authentication usable information added to a cache according to an embodiment of the invention.

FIG. 15 is a diagram showing an example of the authentication usable information added to the cache for authentication usable information. As shown in FIG. 15, as a result of acquisition of the title of the user from the LDAP server 30, in the cache for authentication usable information, a cache in which a cache key 161 is "LDAP:CN=USER_X:Title", a cache value 162 is "MMMmmm1122 . . . ", and generation/use time 163 is "2006/12/1 15:00" is added. In stead of adding the authentication usable information shown in FIG. 15, the cache key 161 of the authentication usable information, which is shown in FIG. 14, may be overwritten. When the fingerprint server 40 or the LDAP sever 30 does not respond and thus data cannot be cached, the process is regularly retried.

As described above, a preparation process in the authenticated printing is completed. Next, an authentication process performed thereafter in the authenticated printing will be described.

Figure 16:
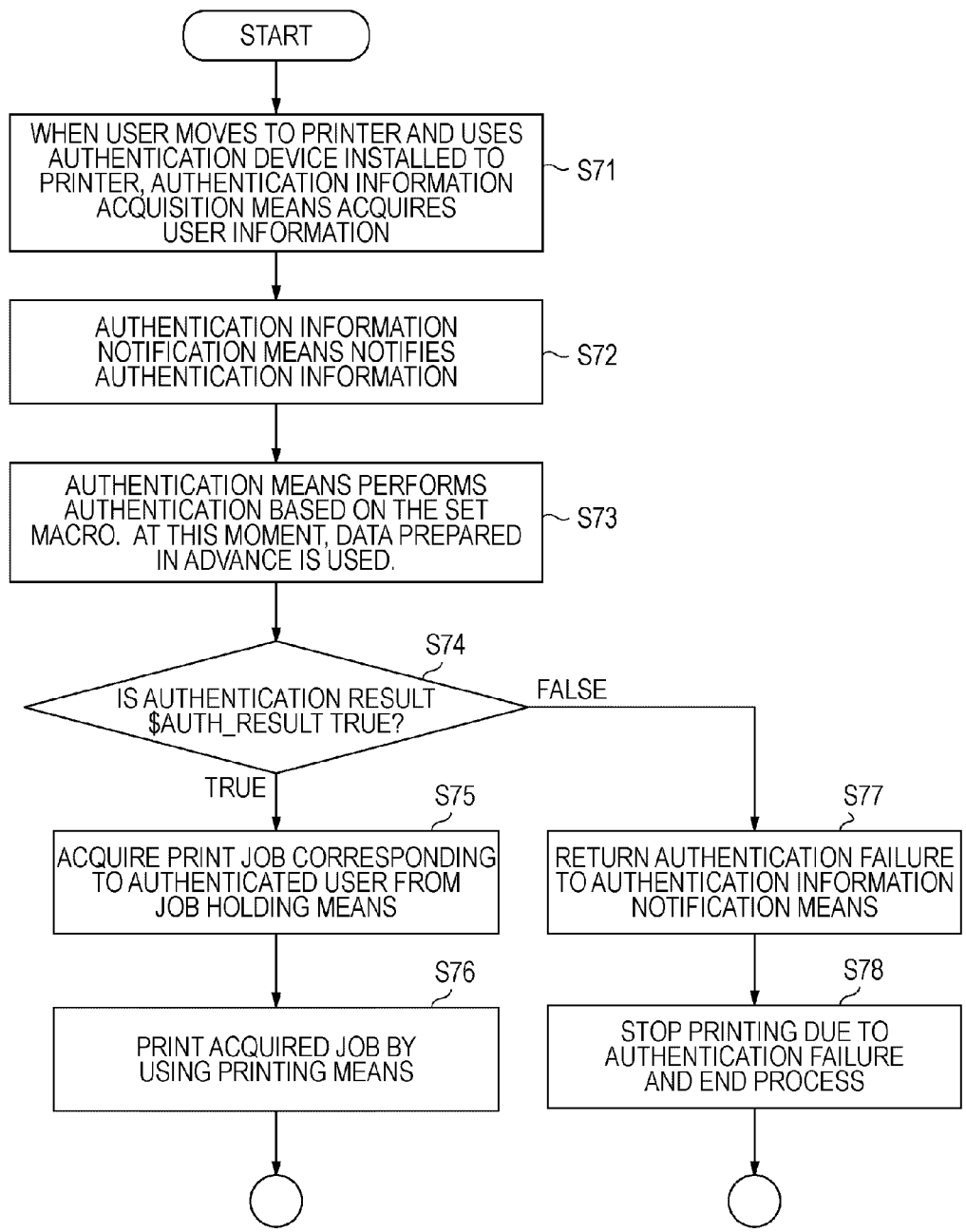
FIG. 16 is a flowchart showing a flow from the authenticated print job is held until an actual printing process is performed according to an embodiment of the invention.

FIG. 16 is a flowchart showing a flow in the authenticated printing system 100 from the authenticated print job is held until an actual printing process is performed. First, when the user moves to the printer 20 and performs read-out of a fingerprint by using the fingerprint reader 25 installed to the printer 20, the authentication information acquisition means 21 generates the fingerprint data "MMMmmm1122 . . . " of the user based on the image information read by the fingerprint reader 25 (S71). Next, the authentication information notification means 22 generates authentication information as shown in FIG. 11 based on the generated fingerprint data and notifies the print server 10 of the generated authentication information (S72).

When the print server 10 receives the authentication information from the printer 20, the authentication means 16 performs an authentication process in accordance with the authentication macro 15 (S73). In the example shown in FIG. 5, the authentication macro 15 executes function Fingerprint_Authenticatin( ) in the 151$^{st}$ line by using the acquired authentication information and verifies whether fingerprint data matching the fingerprint data given as the authentication information is cached in the authentication means 16 (S74). At this moment, when there is corresponding fingerprint data in the cache, a user ID stored in the cache in association with the fingerprint data is acquired. In addition, in the authentication macro 15 shown in FIG. 5, function Ldap_GetAttribute( ) is called using the user ID as an argument and the attribute of the user's title is acquired (155$^{th}$ line). In this example, the added cache shown in FIG. 15 is hit. As described above, when there is data among the cached data which matches the fingerprint data included in the authentication information transmitted from the printer 20, the authentication succeeds. As the result of the authentication, a result representing that the user ID is "USER_X" and the authentication result is "TRUE" is returned to the authentication information notification means 22, and accordingly, the authentication information notification means 22 side can determine that the authentication has succeeded. Thereafter, a print job corresponding to the authenticated user is acquired from the job holding means 11 (S75), and a printing process is performed based on the acquired print job by using the printing means 24 (S76). When the cache is hit, as shown in FIG. 17, the generation/use time 163 is updated to be the use time when the cache has been hit.

Figure 17:
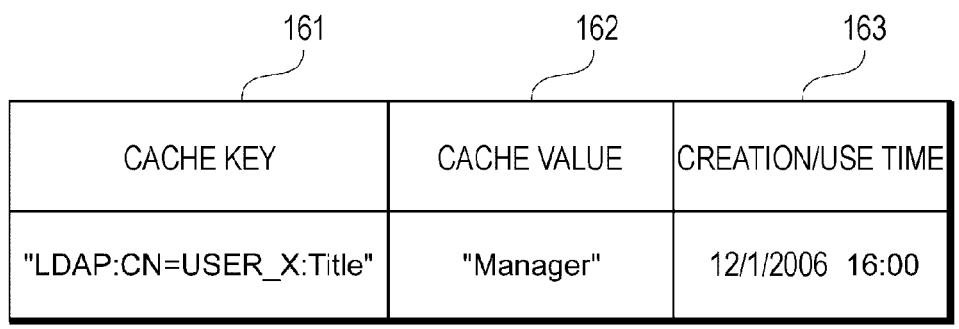
FIG. 17 is a diagram showing an example of updated authentication usable information according to an embodiment of the invention.

FIG. 17 is a diagram showing an example of updated authentication usable information. As shown in FIG. 17, for example, the generation/use time 163 of the authentication usable information is changed from "2006/12/1 15:00" to "2006/12/1 16:00" that is time when the cache has been hit.

On the other hand, when the fingerprint data included in the authentication information transmitted from the printer 20 is not cached in the authentication means 16, the fingerprint server 40 is used for acquiring information and a process for verifying fingerprint data is performed. As a result, when the authentication succeeds, an authenticated printing process corresponding to the authenticated user is performed (S75 and S76). On the other hand, when the authentication in the fingerprint server 40 fails, too, the result representing that the authentication has failed is returned to the authentication information notification means 22 (S77), the printing process is stopped due to the authentication failure, and the process ends (S78).

As described above, in the authentication process for printing, the LDAP server 30 or the fingerprint server 40 is not used, and the result of a high-speed searching in which a searching range is limited to the cache is returned, and thereby, the authentication process can be performed in a speedy manner.

Next, a caching process adjusted to a print job will be described. In this embodiment, when the amount of caching exceeds a predetermined amount of memory or there is a burden on the system, a record that has an oldest generation/use time may be deleted from the cache. In addition, a period for holding a job is provided in the job holding means 11, and the cache may be deleted after the period.

Figure 18:
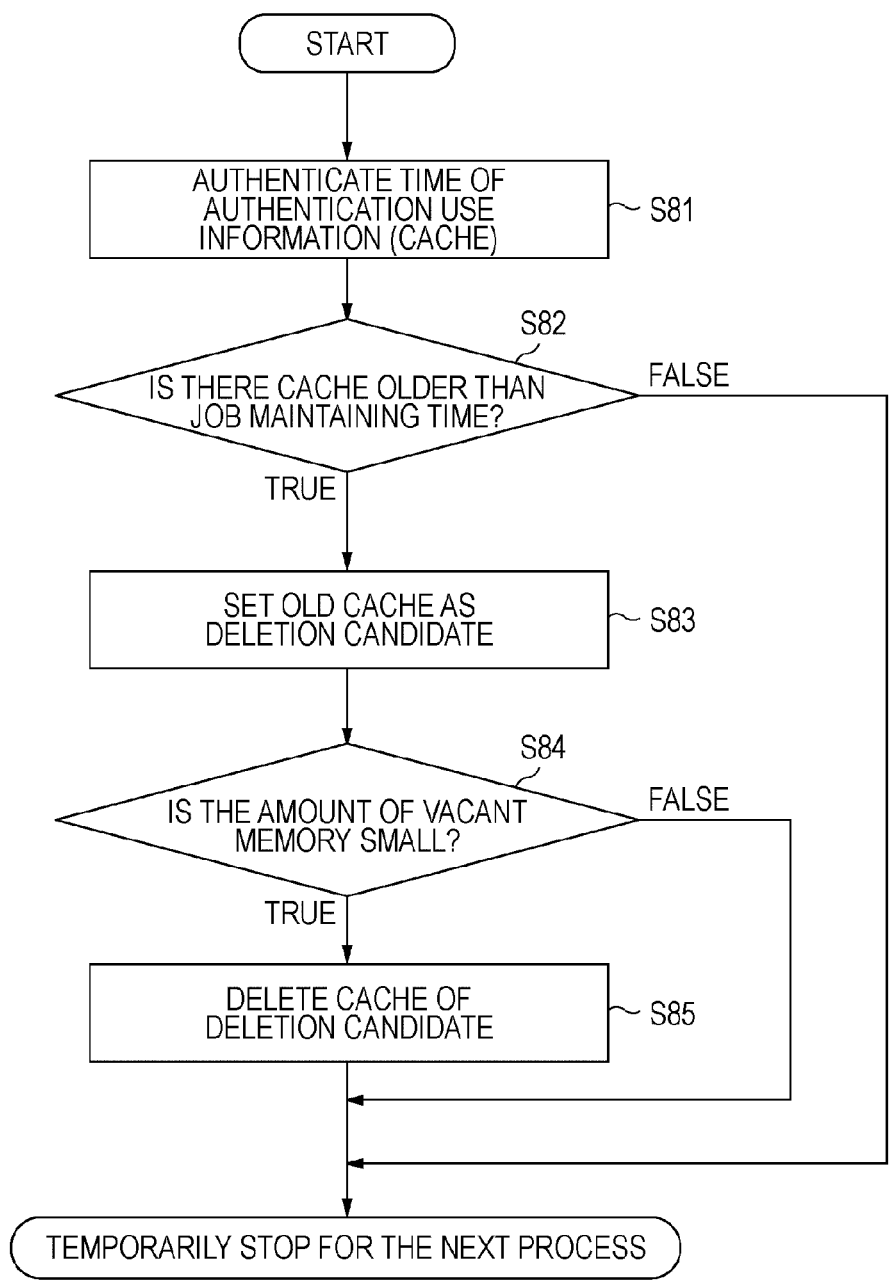
FIG. 18 is a flowchart showing a flow of a caching process adjusted to a print job according to an embodiment of the invention.

FIG. 18 is a flowchart showing a flow of a caching process adjusted to a print job according to an embodiment of the invention. First, generation time/use time 163 of each authentication usable information which is stored in the cache is checked (S81). Then, it is checked whether there is authentication usable information older than a predetermined maintaining time of a print job (S82). When there is authentication usable information older than the maintaining time, the old authentication usable information is set to be a deletion candidate (S83). Then, a vacant memory amount of the cache is checked (S84). When the vacant memory amount is smaller than a predetermined value, the authentication usable information that has been set to be the deletion candidate in Step S83 is deleted from the cache (S85). On the other hand, when authentication usable information older than the predetermined maintaining time is determined not to exist in Step S82, or when the vacant memory amount determined to be larger than the predetermined value in Step S84, the authentication usable information is not deleted from the cache and is maintained. The authentication means 16 performs this caching process regularly or irregularly, and accordingly, the authentication usable information of a print job left without being printed is deleted in accordance with the vacant memory amount of the cache, and thereby, it is possible to use the cache in an effective manner.

As described above, according to an embodiment of the invention, by preparing information required for authentication in a cache in advance in an authenticated printing process, the authentication can be performed at high speed, and thereby convenience of the authenticated printing process is improved. In particular, by dynamically generating the cache (authentication usable information) in accordance with print jobs within a spooler and acquiring an authentication result using the cache, the number of search targets for determining the authentication process in an authenticated printing process is reduced, and thereby the authentication can be performed at high speed. In other words, determining whether there is a user matching data such as a fingerprint or a face image can be performed in a speedy manner as the population decreases, and accordingly, by limiting the search targets, a high-speed authentication process that is especially appropriate for authentication using biometric information can be achieved.

In addition, user attribute information such as LDAP data is scarcely changed, and accordingly, when such data is authenticated every time, overhead is generated. Thus, according to an embodiment of the invention, unchanging information is generated in advance particularly in a case where static information such as LDAP or RDBMS is used for authentication, and thereby high-speed authentication is achieved.

In addition, according to an embodiment of the invention, since a cache is managed such that authentication usable information can be deleted in accordance with a maintaining time of a print job, a burden on the server resource is reduced, and thereby it is possible to use the cache in an effective manner. In other words, since a processing time is required for generating print image data, it is preferable that unnecessary print image data is not generated as possibly as can be. In addition, by limiting the scope of print image data to be generated to print image data for connected printers, the process can be performed at high speed. In addition, the contents having high use frequencies can be managed as the authentication usable information by applying LRU (Least Recently Used) to the cache, and thereby the burden on the server can be reduced.

The present invention is not limited to the above-described embodiments, and the invention may be embodied in many different forms without departing from the gist of the invention. Thus, the above-described embodiments are merely examples in every point, and the invention should not be construed as being limited to the embodiments set forth herein. For example, the above-described process steps may be arbitrary changed in the order or performed in parallel unless the contents of the process steps become contradictory to one another.

In this embodiment, the fingerprint reader 25 is used as an authentication device connected to the printer 20, and fingerprints are used as the authentication information, as an example. However, the authentication information is not limited to fingerprints, and various authentication information such as a password or an ID card in addition to biometric information such as pupil patterns or vein patterns may be used. In addition, as the authentication device, various authentication device such as an operation key for inputting a password or an IC card reader in addition to a reader for reading out pupil patterns or vein patterns may be used in accordance with used authentication information.

In addition, although a configuration in which the LDAP server 30 and the fingerprint server 40 are included separately from the print server 10 is used in this embodiment, a configuration in which data entry of LDAP or a fingerprint database is included in the print server 10 and fingerprint data or the LDAP data of the owner of the print job is stored in the cache in a case where the print job is held may be used.

The entire disclosure of Japanese Patent Application No. 2007-82782, filed Mar. 27, 2007 is expressly incorporated by reference herein.

What is claimed is:

1. An authenticated printing system comprising:
   a job creation unit that creates a print job in accordance with a direction of an user;
   a job holding unit that holds the print job created by the job creation unit;
   an authentication information acquisition unit that generates first authentication information based on information acquired from an authentication device;
   an authentication unit, implemented by a processor and interconnecting to a database server through a network, that receives the first authentication information generated by the authentication information acquisition unit and performs authentication of an user based on the first authentication information; and
   a print unit that acquires the print job of an authenticated user from the job holding unit and prints the print job in a case where the user is authenticated by the authentication unit,
   wherein the authentication unit includes:
   a process section that acquires second authentication information of an owner of the print job from the database server and stores the acquired second authentication information in a cache as authentication usable information when the print job is held by the job holding unit, and
   a process section that performs the authentication of the user based on whether the authentication usable information stored in the cache corresponds to the first authentication information generated by the authentication information acquisition unit,
   wherein the authentication unit acquires the second authentication information of the owner of the print job from the database server prior to the first authentication information generated by the authentication information acquisition unit.

2. The authenticated printing system according to claim 1, wherein a result of a static process relating to the authentication is maintained in the authentication usable information.

3. The authenticated printing system according to claim 1, wherein the authentication usable information is managed such that the authentication usable information can be deleted in accordance with a maintaining time of the print job.

4. The authenticated printing system according to claim 1, wherein the authentication usable information is managed such that the oldest authentication usable information can be deleted preferentially.

5. The authenticated printing system according to claim 1, wherein the authentication unit acquires a title of the owner from a server.

6. The authenticated printing system according to claim 1, wherein the first authentication information generated by the authentication information acquisition unit is fingerprint information.

7. The authenticated printing system according to claim 6, wherein the authentication unit determines if the fingerprint information matches the authentication usable information that is stored in the cache.

8. An authenticated printing system comprising:
   an user terminal including a job creation unit that creates a print job in accordance with a direction of a user;
   a print server including a job holding unit that receives the print job created by the job creation unit and holds the print job and an authentication unit interconnecting to a database server through a network, that receives first authentication information generated by an authentication information acquisition unit and performs authentication of a user based on the first authentication information; and a printer including the authentication information acquisition unit that generates the first authentication information based on information acquired from an authentication device and a print unit that acquires the print job of an authenticated user from the job holding unit and prints the print job in a case where the user is authenticated by the authentication unit, wherein the user terminal and the print server and the printer are interconnected through a network, and wherein the authentication unit includes:

a process section that acquires second authentication information of an owner of the print job from the database server and stores the acquired second authentication information in a cache as authentication usable information when the print job is held by the job holding unit, and a process section that performs the authentication of the user based on whether the authentication usable information stored in the cache corresponds to the first authentication information generated by the authentication information acquisition unit, wherein the authentication unit acquires the second authentication information of the owner of the print job from the database server prior to the first authentication information generated by the authentication information acquisition unit.

9. An authenticated printing method comprising:

creating a print job in accordance with a direction of an user;

holding the print job created by the creating of a print job in a spooler;

acquiring first authentication information of an owner of the print job from a database server through a network and storing the first authentication information in a cache as authentication usable information when the print job is held by the holding of the print job;

generating second authentication information based on information acquired from an authentication device;

receiving the generated second authentication information and performing authentication of a user based on whether the authentication usable information stored in the cache corresponds to the second authentication information; and acquiring the print job of an authenticated user from the spooler and printing the print job in a case where the user is authenticated by the receiving of the second authentication information, wherein the first authentication information of the owner of the print job is acquired from the database server prior to the generation of the second authentication information.

10. A non-transitory program recording media allowing a computer to perform the authenticated printing method according to claim 9.

* * * * *